(12) United States Patent
Hiramaru

(10) Patent No.: US 11,459,058 B2
(45) Date of Patent: Oct. 4, 2022

(54) SUSPENSION FOR VEHICLE

(71) Applicant: HONDA MOTOR CO., LTD., Tokyo (JP)

(72) Inventor: Masayuki Hiramaru, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 259 days.

(21) Appl. No.: 16/814,062

(22) Filed: Mar. 10, 2020

(65) Prior Publication Data

US 2020/0324851 A1    Oct. 15, 2020

(30) Foreign Application Priority Data

Apr. 15, 2019   (JP) .............................. JP2019-077065

(51) Int. Cl.
   *B62K 25/10*       (2006.01)
   *B62K 25/04*       (2006.01)

(52) U.S. Cl.
   CPC ........ *B62K 25/10* (2013.01); *B62K 2025/045* (2013.01); *B62K 2201/08* (2013.01)

(58) Field of Classification Search
   CPC .............. B62K 25/10; B62K 2025/045; B62K 2201/08; B62K 25/04; B62K 25/20; B62K 2025/044
   USPC ....................................................... 280/285
   See application file for complete search history.

(56) References Cited

FOREIGN PATENT DOCUMENTS

| DE | 102009012563 B4 * | 5/2016 | ........... B62K 25/283 |
|---|---|---|---|
| JP | S59-140933 A | 8/1984 | |
| JP | 2007-71299 A | 3/2007 | |
| JP | 2007071299 A * | 3/2007 | |
| JP | 4602876 B2 | 12/2010 | |
| JP | 2014-9806 A | 1/2014 | |
| JP | 3211286 | 6/2017 | |

OTHER PUBLICATIONS

Indian Office Action dated May 3, 2021, 6 pages.
Chinese Office Action with English translation dated May 6, 2021, 14 pages.
Japanese Office Action with English translation dated Feb. 16, 2021, 13 pages.

* cited by examiner

*Primary Examiner* — Jacob D Knutson
*Assistant Examiner* — Felicia L. Brittman
(74) *Attorney, Agent, or Firm* — Rankin, Hill & Clark LLP

(57) ABSTRACT

In a suspension for a vehicle including a pre-load adjustment mechanism, the pre-load adjustment mechanism includes a pre-load controller and an intermediate member, the pre-load controller being arranged at one end portion and receiving a spring, the intermediate member being sandwiched between the pre-load controller and the spring, the pre-load controller fits in an outer circumferential portion of the one end portion and is movable in the stroke direction by turning on a thread portion of the outer circumferential portion, the one end portion includes a long groove portion in the outer circumferential portion, the long groove portion extending in the stroke direction, the intermediate member has a ring-shape and is movable in the stroke direction, the outer circumferential portion being inserted to the ring-shape, and the intermediate member includes an engagement portion that engages with the long groove portion.

8 Claims, 11 Drawing Sheets

SUSPENSION FOR VEHICLE

INCORPORATION BY REFERENCE

The present application claims priority under 35 U.S.C. § 119 to Japanese Patent Application No. 2019-077065 filed on Apr. 15, 2019. The content of the application is incorporated herein by reference in its entirety.

TECHNICAL FIELD

The present invention relates to a suspension for a vehicle.

BACKGROUND ART

Conventionally, in a suspension for a vehicle including a pre-load adjustment mechanism, there has been known one in which the pre-load adjustment mechanism includes a controller and an adjuster, the adjuster including a thread portion fitted with the controller and receiving a spring of the suspension (refer to Patent Literature 1 for example). In Patent Literature 1, when the controller is controlled to turn, the adjuster moves through the thread portion, and the pre-load of the spring is changed.

CITATION LIST

Patent Literature

[Patent Literature 1] Japanese Registered Utility Model No. 3211286

SUMMARY OF INVENTION

Technical Problem

However, in the suspension for the vehicle of the prior art described above, when a large load is applied to the spring, it is possible that the adjuster and the controller turn by a reaction force of the spring through the thread portion and the pre-load changes. Although turning of the controller can be prevented using a double nut structure and the like, it involves an effort in adjusting the pre-load in this case.

The present invention has been achieved in view of the above-mentioned circumstances, and it is an object of the present invention to prevent a pre-load from being changed by a reaction force of a spring and to allow the pre-load to be easily adjusted in a suspension for a vehicle.

Solution to Problem

In a suspension for a vehicle including one end portion (60), the other end portion (61) that strokes with respect to the one end portion (60), a spring (62) that is compressed between the one end portion (60) and the other end portion (61), and a pre-load adjustment mechanism (70) that can adjust a pre-load of the spring (62), the pre-load adjustment mechanism (70) includes a pre-load controller (71) and an intermediate member (72), the pre-load controller (71) being arranged at the one end portion (60) and receiving the spring (62), the intermediate member (72) being sandwiched between the pre-load controller (71) and the spring (62), the pre-load controller (71) fits in an outer circumferential portion (60a) of the one end portion (60) and is movable in the stroke direction by turning on a thread portion (60b) of the outer circumferential portion (60a), the one end portion (60) includes a long groove portion (77) in the outer circumferential portion (60a), the long groove portion (77) extending in the stroke direction, the intermediate member (72) has a ring-shape and is movable in the stroke direction, the outer circumferential portion (60a) being inserted to the ring-shape, and the intermediate member (72) includes an engagement portion (85) that engages with the long groove portion (77) and the intermediate member (72) is restricted from turning by that the engagement portion (85) engages with the long groove portion (77).

Also, in the configuration described above, it is also possible that the pre-load controller (71) and the intermediate member (72) engage with each other by an irregularity (87) that is configured with a recessed portion (80) and a projected portion (86), one of the recessed portion (80) and the projected portion (86) is arranged in the pre-load controller (71), the other of the recessed portion (80) and the projected portion (86) is arranged in the intermediate member (72), and engagement by the irregularity (87) is released when the pre-load controller (71) is turned resisting a reaction force of the spring (62).

Also, in the configuration described above, it is also possible that the irregularities (87) are arranged at three positions or more at equal intervals in the circumferential direction of the pre-load controller (71).

Also, in the configuration described above, it is also possible that the pre-load controller (71) includes an annular recessed portion (79) that is arranged so as to surround the outer circumferential portion (60a), and the intermediate member (72) includes a cylindrical projected portion (84) that fits in the annular recessed portion (79).

Also, in the configuration described above, it is also possible that the engagement portion (85) of the intermediate member (72) includes a curved surface portion (85c) at an engagement surface engaging with the long groove portion (77).

Also, in the configuration described above, it is also possible that the intermediate member (72) includes a first intermediate member (81) and a second intermediate member (82), the first intermediate member (81) including the engagement portion (85), the second intermediate member (82) being sandwiched between the first intermediate member (81) and the spring (62).

Also, in the configuration described above, it is also possible that the second intermediate member (82) is relatively turnable with respect to the first intermediate member (81).

Also, in the configuration described above, it is also possible that the pre-load controller (71) includes a recessed portion for tool (71b) at the outer circumference of an end portion on the opposite side of the annular recessed portion (79) in the stroke direction, a tool being capable of being inserted to the recessed portion for tool (71b).

Also, in the configuration described above, it is also possible that the suspension for the vehicle is a rear suspension (29) that connects a swing arm (13) and a body of the vehicle to each other, the swing arm (13) swingably supporting a rear wheel (3) of the vehicle.

Advantageous Effects of Invention

A suspension for a vehicle includes one end portion, the other end portion that strokes with respect to the one end portion, a spring that is compressed between the one end portion and the other end portion, and a pre-load adjustment mechanism that can adjust a pre-load of the spring, the pre-load adjustment mechanism includes a pre-load controller and an intermediate member, the pre-load controller being arranged at the one end portion and receiving the spring, the intermediate member being sandwiched between the pre-load controller and the spring, the pre-load controller fits in an outer circumferential portion of the one end portion and is movable in the stroke direction by turning on a thread portion of the outer circumferential portion, the one end portion includes a long groove portion in the outer circumferential portion, the long groove portion extending in the stroke direction, the intermediate member has a ring-shape and is movable in the stroke direction, the outer circumferential portion being inserted to the ring-shape, and the intermediate member includes an engagement portion that engages with the long groove portion and the intermediate member is restricted from turning by that the engagement portion engages with the long groove portion.

According to this configuration, since turning of the intermediate member is restricted by that the engagement portion engages with the long groove portion of the outer circumferential portion of the one end portion, a reaction force of the spring prompting to turn the pre-load controller is blocked by the intermediate member. Therefore, the pre-load can be prevented from being changed by the reaction force of the spring. Also, since turning of the pre-load controller can be prevented even when a double nut structure and the like are not used, at the time of adjusting the pre-load, the pre-load can be adjusted easily by turning the pre-load controller with simple operation.

Also, in the configuration described above, it is also possible that the pre-load controller and the intermediate member engage with each other by an irregularity that is configured with a recessed portion and a projected portion, one of the recessed portion and the projected portion is arranged in the pre-load controller, and the other of the recessed portion and the projected portion is arranged in the intermediate member, and engagement by the irregularity is released when the pre-load controller is turned resisting a reaction force of the spring.

According to this configuration, by the irregularity where the pre-load controller and the intermediate member engage with each other, turning of the pre-load controller caused by the reaction force of the spring can be prevented. Also, at the time of adjusting the pre-load, by turning the pre-load controller resisting the reaction force of the spring, engagement by the irregularity can be released, and the pre-load can be adjusted easily.

Also, in the configuration described above, it is also possible that the irregularities are arranged at three positions or more at equal intervals in the circumferential direction of the pre-load controller.

According to this configuration, since the intermediate member can be supported by the projection portions that are arranged at three positions or more at equal intervals in the circumferential direction of the pre-load controller in a state engagement by the irregularities is released, the intermediate member can be prevented from being tilted. When the pre-load controller is turned, the pre-load controller is positioned consecutively by the irregularities located at equal intervals in the circumferential direction. Therefore, the adjustment width of the pre-load becomes stepwise, and the pre-load can be adjusted easily. Since the irregularities are arranged at three positions or more, the pre-load can be adjusted finely.

Also, in the configuration described above, it is also possible that the pre-load controller includes an annular recessed portion that is arranged so as to surround the outer circumferential portion, and the intermediate member includes a cylindrical projected portion that fits in the annular recessed portion.

According to this configuration, the intermediate member can be supported by fitting of the annular recessed portion and the cylindrical projected portion in each other, and the intermediate member can be prevented from being tilted at the time of adjusting the pre-load.

Also, in the configuration described above, it is also possible that the engagement portion of the intermediate member includes a curved surface portion at an engagement surface engaging with the long groove portion.

According to this configuration, hitting of the engagement portion with respect to the long groove portion can be made soft, and the long groove portion can be prevented from being scarred. Also, the engagement portion can be formed easily by a drawing process.

Also, in the configuration described above, it is also possible that the intermediate member includes a first intermediate member and a second intermediate member, the first intermediate member including the engagement portion, the second intermediate member being sandwiched between the first intermediate member and the spring.

According to this configuration, since a portion where the engagement portion is arranged and a portion that receives the spring are arranged separately in the first intermediate member and the second intermediate member, the material and the working method of the intermediate member can be made more suitable.

Also, in the configuration described above, it is also possible that the second intermediate member is relatively turnable with respect to the first intermediate member.

According to this configuration, since the second intermediate member turns with respect to the first intermediate member, a reaction force of the spring can be released, and turning of the pre-load controller can be prevented.

Also, in the configuration described above, it is also possible that the pre-load controller includes a recessed portion for tool at the outer circumference of an end portion on the opposite side of the annular recessed portion in the stroke direction, a tool being capable of being inserted to the recessed portion for tool.

According to this configuration, the pre-load controller is turned by the tool that is inserted to the recessed portion for tool, and the pre-load can be adjusted easily. Also, by disposing the annular recessed portion and the recessed portion for tool separately in the stroke direction, rigidity of the pre-load controller can be secured.

Also, in the configuration described above, it is also possible that the suspension for the vehicle is a rear suspension that connects a swing arm and a body of the vehicle to each other, the swing arm swingably supporting a rear wheel of the vehicle.

According to this configuration, in a rear suspension where a load of the spring is large, turning of the pre-load controller can be prevented effectively, and the pre-load can be adjusted easily.

DESCRIPTION OF EMBODIMENTS

Figure 1:
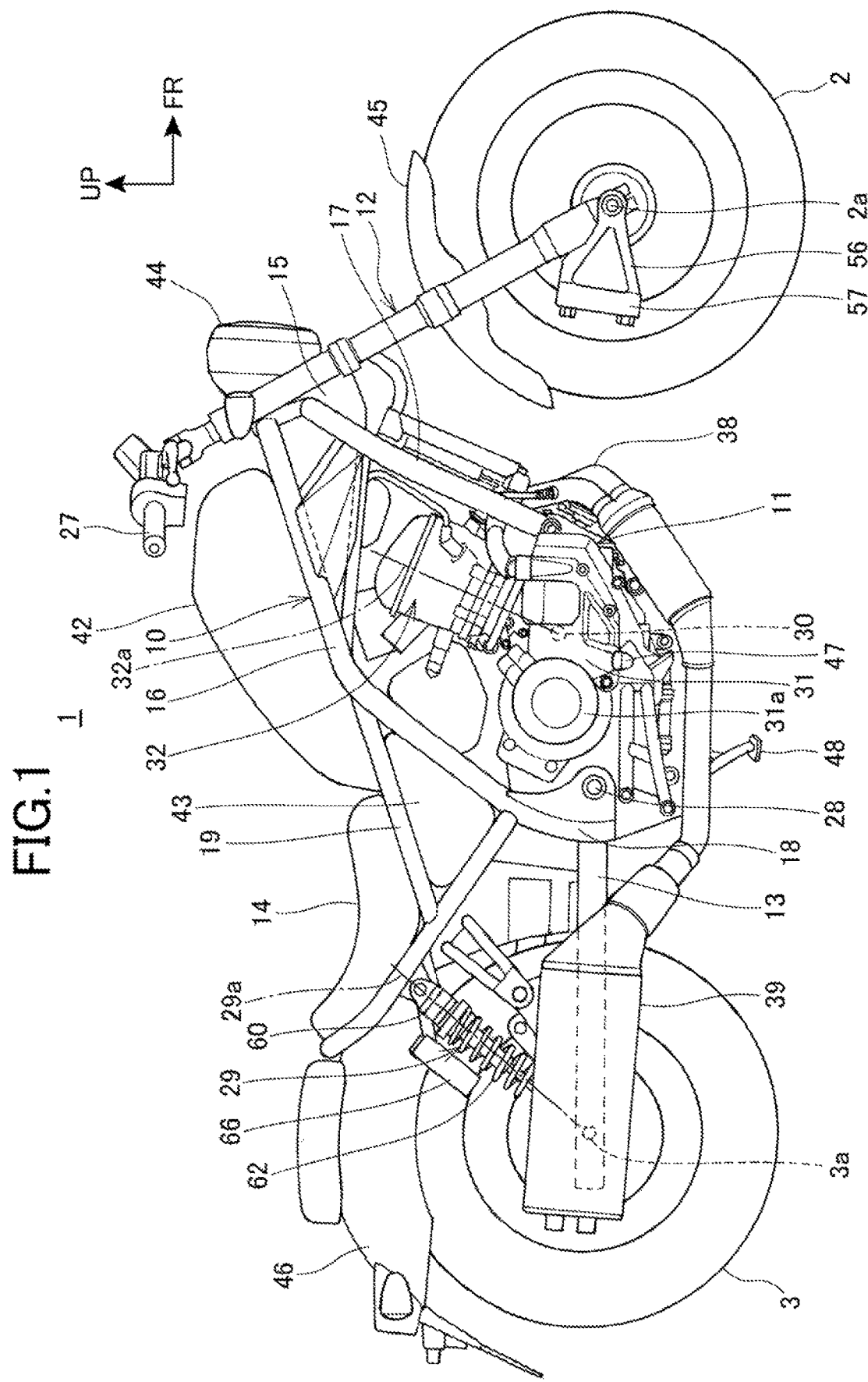
FIG. 1 is a right side view of a motorcycle related to an embodiment of the present invention.

Preferable embodiments of the present invention will be hereinafter explained referring to the drawings. In the explanation, description of the direction such as the front, rear, left, right, up, and down is to be same with the direction with respect to the vehicle body unless a specific description is given. Also, a sign FR shown in each drawing represents vehicle body forward, a sign UP represents vehicle body upward, and a sign LH represents vehicle body left hand.

FIG. 1 is a right side view of a motorcycle 1 related to an embodiment of the present invention.

The motorcycle 1 is a vehicle in which an engine 11 as a power unit is supported by a body frame 10, front forks 12 are supported by the front end of the body frame 10 in a swingable manner, the front forks 12 supporting a front wheel 2 in a steerable manner, and a swing arm 13 is arranged on the rear side of the body frame 10, the swing arm 13 supporting a rear wheel 3.

The motorcycle 1 is a saddle riding vehicle on which a rider sits so as to straddle a seat 14, and the seat 14 is arranged above the rear portion of the body frame 10.

The body frame 10 includes a head pipe 15, a pair of left and right main frames 16, a pair of left and right down frames 17, a pair of left and right pivot frames 18, and a seat frame 19, the head pipe 15 arranged at the front end of the body frame 10, the main frames 16 extending downward to the rear from the head pipe 15, the down frames 17 extending downward to the rear from below the main frames 16 in the head pipe 15, the pivot frames 18 extending downward from the rear end of the main frames 16, the seat frame 19 extending rearward from the rear portion of the main frames 16 and the upper portion of the pivot frames 18.

The front forks 12 are supported by the body frame 10 in a turnable manner through a steering shaft (not illustrated) that is inserted to the head pipe 15. A handlebar 27 for steering is arranged at the upper end portion of the front forks 12. The front wheel 2 is pivotally supported by an axle 2a that is arranged at the lower end portion of the front forks 12.

The swing arm 13 is pivotally supported by a pivot shaft 28 that is supported by the left and right pivot frames 18. The pivot shaft 28 extends horizontally in the vehicle width direction. The swing arm 13 is pivotally supported by the pivot shaft 28 at the front end portion, and swings vertically around the pivot shaft 28.

The rear wheel 3 is pivotally supported by an axle 3a that is arranged at the rear end portion of the swing arm 13.

The motorcycle 1 includes a pair of left and right rear suspensions 29 (suspensions for a vehicle) that is stretched between the rear end portion of the swing arm 13 and the seat frame 19.

The engine 11 is disposed between the down frames 17 and the pivot frames 18 in the vehicle longitudinal direction below the main frames 16, and the engine 11 is fixed to the body frame 10.

The engine 11 includes a crankcase 31 and a cylinder portion 32, the crankcase 31 supporting a crankshaft 30 that extends horizontally in the vehicle width direction (the left-right direction), the cylinder portion 32 being arranged at the upper portion of the front portion of the crankcase 31. A cylinder axis 32a of the cylinder portion 32 inclines forward with respect to the vertical direction, the cylinder portion 32 storing a piston (not illustrated).

An exhaust pipe 38 of the engine 11 is drawn out downward from an exhaust port of the front surface of the cylinder portion 32, and extends rearward. A muffler 39 is disposed on the outer lateral side of the rear wheel 3, and is connected to the rear end of the exhaust pipe 38.

The rear portion of the crankcase 31 is a transmission case portion 31a that stores a transmission. An output of the engine 11 is transmitted to the rear wheel 3 by a drive chain (not illustrated) that connects an output shaft of the transmission and the rear wheel 3 to each other.

A fuel tank 42 is disposed between the head pipe 15 and the seat 14 above the main frames 16.

The motorcycle 1 includes a side cover 43 that covers a gap between the seat frame 19 and the main frame 16.

A head light 44 is disposed in front of the head pipe 15, and is supported by the front forks 12.

A front fender 45 is supported by the front forks 12, the front fender 45 covering the front wheel 2 from above.

The rear wheel 3 is covered by a rear fender 46 from above, the rear fender 46 being disposed behind the seat 14.

A pair of left and right steps 47 is disposed in front of the left and right pivot frames 18, the rider on the seat 14 placing the feet on the steps 47.

A side stand 48 is supported by the lower end portion of the pivot frame 18 of the left side.

A caliper bracket 56 is arranged at the rear portion of the lower end portion of the front forks 12, and a brake caliper 57 of a brake device of the front wheel 2 is fixed to the caliper bracket 56.

Figure 2:
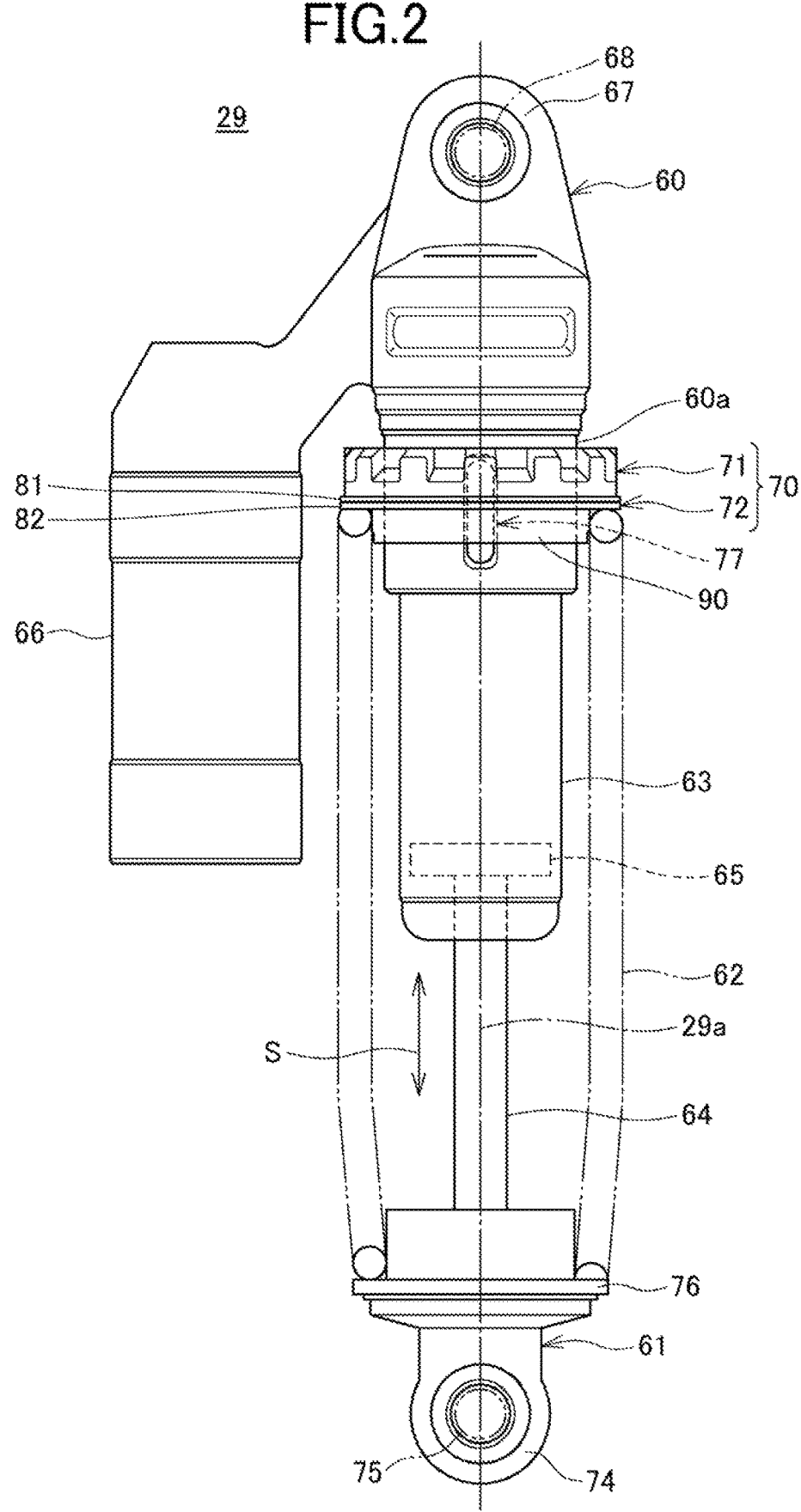
FIG. 2 is a side view of a rear suspension of the right side.

FIG. 2 is a side view of the rear suspension 29 of the right side. Since the rear suspensions 29 are configured similarly between the left and right ones, explanation is made here referring to the rear suspension 29 of the right side.

Referring to FIG. 1 and FIG. 2, the rear suspension 29 is formed to have a cylindrical shape connecting the seat 14 and the rear end portion of the swing arm 13, is compressed in the axial direction accompanying vertical swinging of the swing arm 13, strokes in the axial direction, and thereby absorbs the impact from the road surface.

The rear suspension 29 is disposed in such attitude that a center axis 29a of the stroke of the rear suspension 29 inclines forward with respect to the vertical line. A stroke direction S that is the direction of the stroke of the rear suspension 29 is parallel to the center axis 29a.

The rear suspension 29 includes one end portion 60, the other end portion 61, and a spring 62, the one end portion 60 being connected to the seat frame 19, the other end portion 61 being connected to the swing arm 13, the spring 62 being compressed between the one end portion 60 and the other end portion 61. The one end portion 60 is the upper end portion of the rear suspension 29, and the other end portion 61 is the lower end portion of the rear suspension 29.

Also, the rear suspension 29 includes a cylinder 63, a piston rod 64, and a piston valve 65, the cylinder 63 extending downward from the one end portion 60 to the other end portion 61 side, the piston rod 64 extending upward from the other end portion 61 to the one end portion 60 side and being connected to the cylinder 63, the piston valve 65 being arranged at the end portion of the piston rod 64 and being positioned inside the cylinder 63. The axis of the piston rod 64 is coaxial with the center axis 29a.

Inside the cylinder 63, a hydraulic oil for damping is filled. When the other end portion 61 strokes vertically, the piston valve 65 moves integrally with the other end portion 61, and slides in the axial direction of the center axis 29a inside the cylinder 63 resisting the hydraulic oil.

The spring 62 is a coil spring. The cylinder 63 and the piston rod 64 are inserted to the inner circumference of the coil of the spring 62. That is, the spring 62 is furnished so as to wind around the cylinder 63 and the piston rod 64.

The one end portion 60 is a cylindrical member that is long in the vertical direction.

At the upper end of one end portion 60, an upper connection portion 67 is arranged, the upper connection portion 67 being connected to the seat frame 19. The one end portion 60 is connected to the seat frame 19 by a connection shaft 68 that is inserted to the upper connection portion 67 in the vehicle width direction. To the upper portion of the one end portion 60, a reservoir tank 66 is connected, the reservoir tank 66 storing the hydraulic oil. The reservoir tank 66 communicates with the inside of the cylinder 63.

At an outer circumferential portion 60a of the lower portion of the one end portion 60, a pre-load adjustment mechanism 70 is arranged, the pre-load adjustment mechanism 70 moving in the stroke direction S of the rear suspension 29 and being capable of adjusting the pre-load of the spring 62.

The pre-load adjustment mechanism 70 includes a pre-load controller 71 and an intermediate member 72, the pre-load controller 71 receiving the upper end of the spring 62, the intermediate member 72 being sandwiched between the pre-load controller 71 and the upper end of the spring 62.

At the lower end of the other end portion 61, a lower connection portion 74 is arranged, the lower connection portion 74 being connected to the swing arm 13. The lower connection portion 74 is connected to the swing arm 13 by a connection shaft 75 that is inserted to the lower connection portion 74 in the vehicle width direction.

At the upper portion of the other end portion 61, a spring receive member 76 is arranged, the spring receive member 76 having a ring shape receiving the lower end of the spring 62.

The spring 62 is arranged in a state of being compressed between the pre-load adjustment mechanism 70 of the one end portion 60 and the spring receive member 76 of the other end portion 61, and energizes the other end portion 61 to the expansion direction of the rear suspension 29.

The pre-load (initial load) of the spring 62 is a reaction force of the spring 62 that is compressed between the pre-load adjustment mechanism 70 and the spring receive member 76. The magnitude of the pre-load corresponds to the deflection (compression amount) from the free length of the spring 62.

Figure 3:
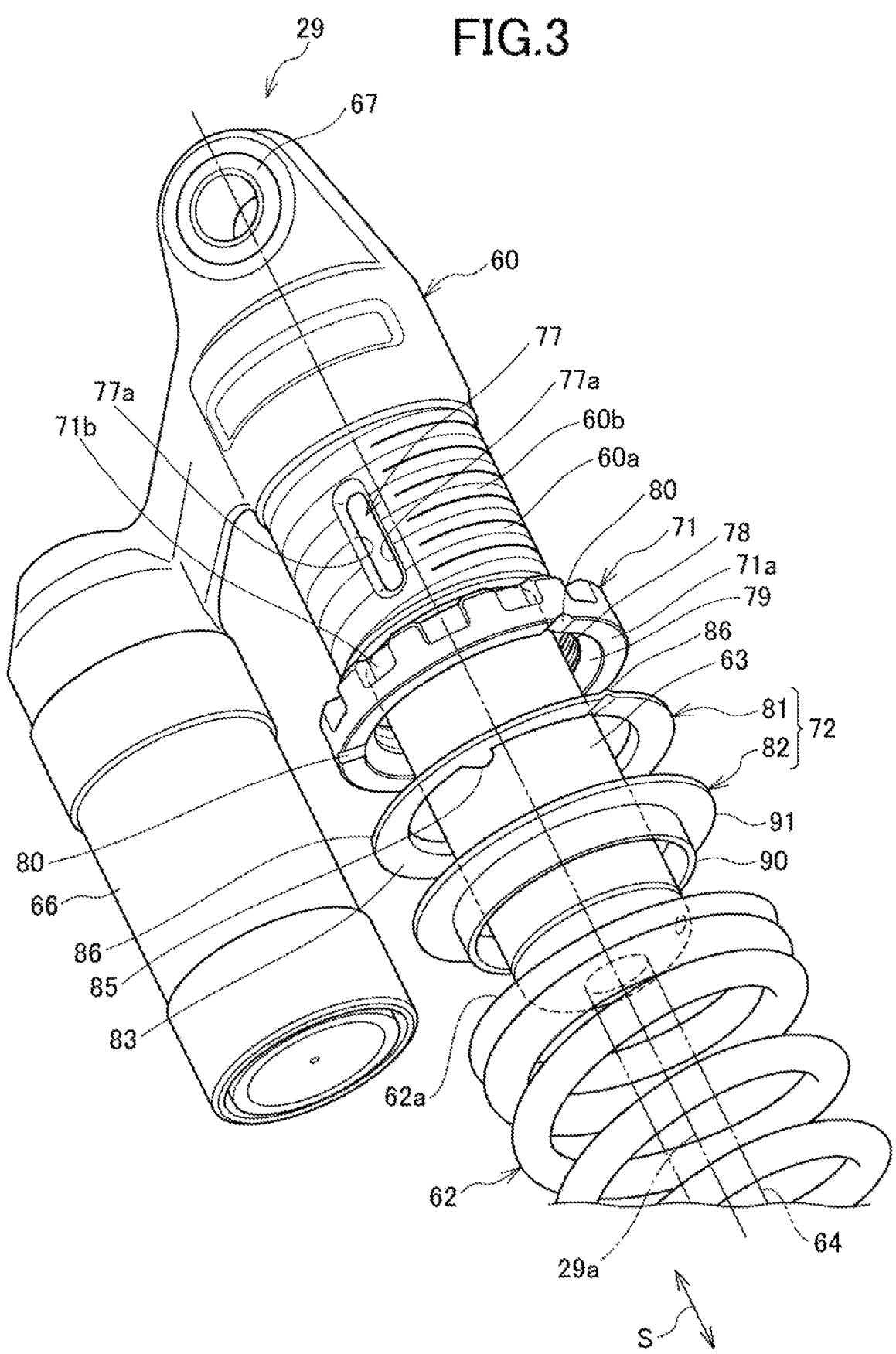
FIG. 3 is an exploded perspective view of a structure of the upper portion of the rear suspension.
Figure 4:
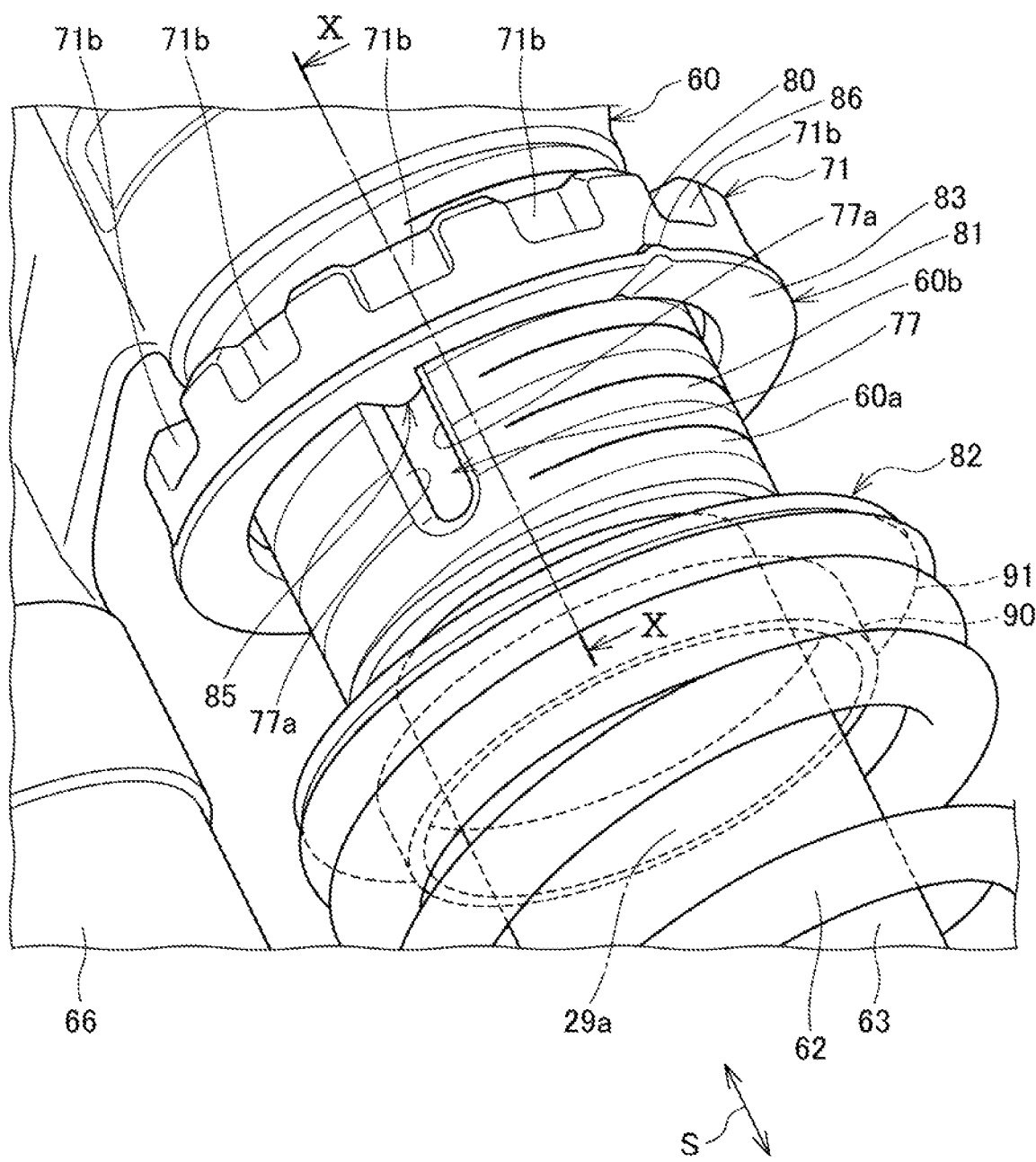
FIG. 4 is a perspective view showing a structure of a circumferential portion of a pre-load adjustment mechanism.

FIG. 3 is an exploded perspective view of a structure of the upper portion of the rear suspension 29. FIG. 4 is a perspective view showing a structure of a circumferential portion of the pre-load adjustment mechanism 70. In FIG. 4, there is shown a state of shifting a second intermediate member 82 described below downward so that the outer circumferential portion 60a can be seen.

Referring to FIG. 2 to FIG. 4, at the outer circumferential portion 60a of the one end portion 60, a thread portion 60b is arranged, the center axis 29a being made the axial direction of the thread portion 60b.

Also, at the outer circumferential portion 60a, a long groove portion 77 is arranged, the long groove portion 77 extending in the stroke direction S of the rear suspension 29. The long groove portion 77 is a recessed groove arranged in the surface of the outer circumferential portion 60a, and a pair of inner wall portions 77a defining the width of the long groove portion 77 extends in parallel with the center axis 29a. The long groove portion 77 is longer in the stroke direction S of the rear suspension 29 than in the circumferential direction of the outer circumferential portion 60a.

Figure 5:
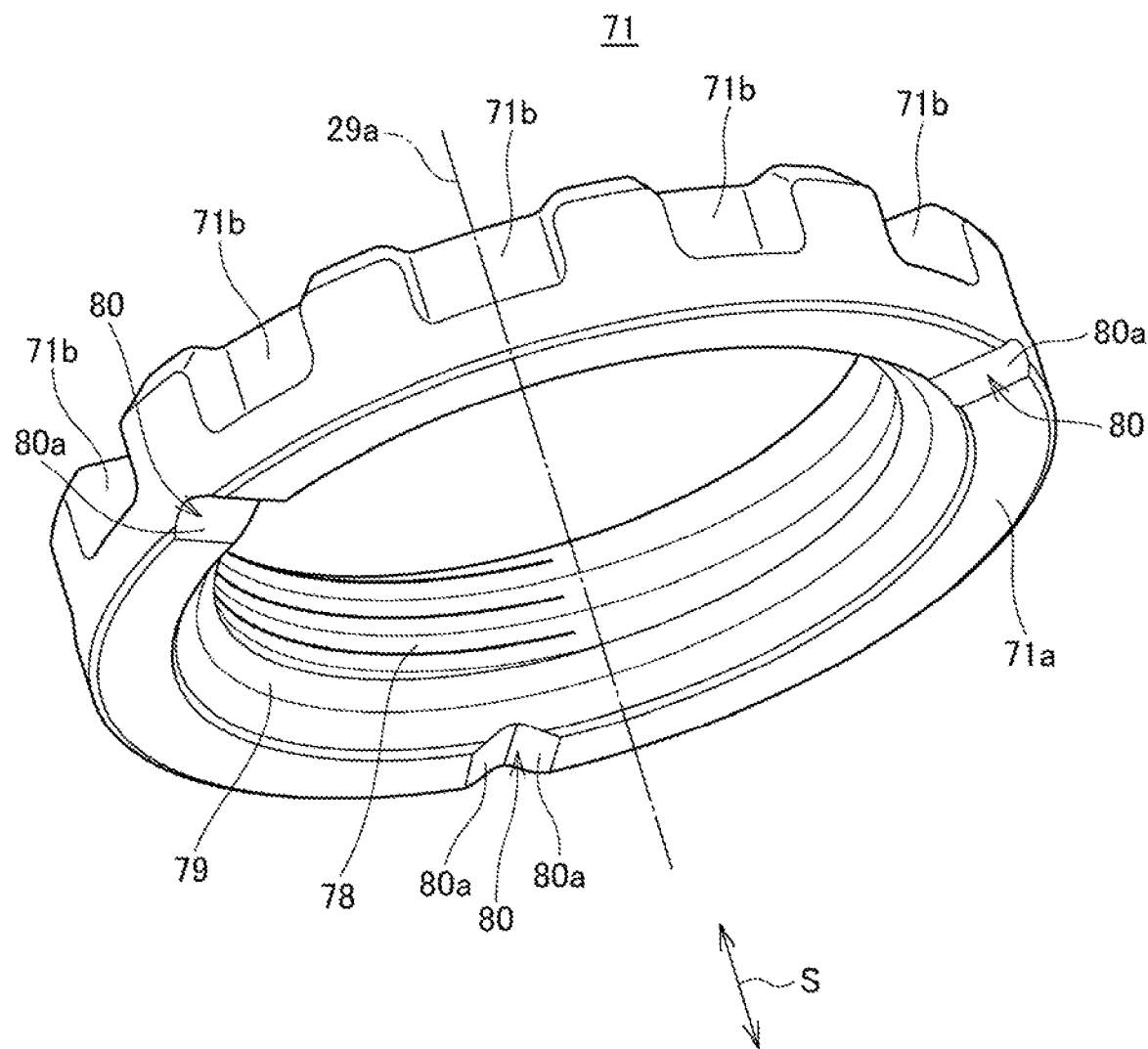
FIG. 5 is a perspective view when a pre-load controller is viewed from the lower side.

FIG. 5 is a perspective view when the pre-load controller 71 is viewed from the lower side.

Referring to FIG. 2 to FIG. 5, the pre-load controller 71 is a nut having a ring shape fitting in the outer circumferential portion 60a of the one end portion 60.

In the inner circumferential portion of the pre-load controller 71, an internal thread portion 78 and an annular recessed portion 79 are arranged, the internal thread portion 78 fitting in the thread portion 60b of the outer circumferential portion 60a of the one end portion 60, the annular recessed portion 79 having a larger diameter compared to the internal thread portion 78.

The lower surface of the pre-load controller 71 is an abutment surface 71a that abuts on the intermediate member 72 in the stroke direction S.

In the abutment surface 71a, plural numbers of recessed portions 80 recessed in the stroke direction S are arranged at equal intervals in the circumferential direction of the pre-load controller 71. Here, the recessed portions 80 are arranged at three positions at equal intervals in the circumferential direction of the pre-load controller 71. That is, the recessed portions 80 are arranged at intervals of 120° in the circumferential direction of the pre-load controller 71.

The pre-load controller 71 moves in the stroke direction S on the outer circumferential portion 60a by turning on the thread portion 60b of the outer circumferential portion 60a through the internal thread portion 78.

The annular recessed portion 79 is arranged annularly so as to surround the outer circumferential portion 60a from the outer side, and is disposed coaxially to the internal thread portion 78. The annular recessed portion 79 is a recessed portion where a portion on the inner circumferential side of the abutment surface 71a is recessed in the stroke direction S.

Each of the recessed portion 80 is disposed on the outer side in the radial direction with respect to the annular recessed portion 79.

Also, the pre-load controller 71 includes a recessed portion for tool 71b in the outer circumference of the end portion on the opposite side of the annular recessed portion 79 in the stroke direction S, a tool being capable of being inserted to the recessed portion for tool 71b. That is, the recessed portion for tool 71b is arranged at a position apart from the annular recessed portion 79 in the stroke direction S.

The recessed portion for tool 71b is a recessed portion where the outer circumferential portion of the pre-load controller 71 is recessed in the radial direction, and the recessed portion for tool 71b is arranged by plural numbers in the circumferential direction of the pre-load controller 71.

The tool described above is a hook-like wrench for example including a claw portion that engages with the recessed portion for tool 71*b* from the outer side in the radial direction.

Figure 6:
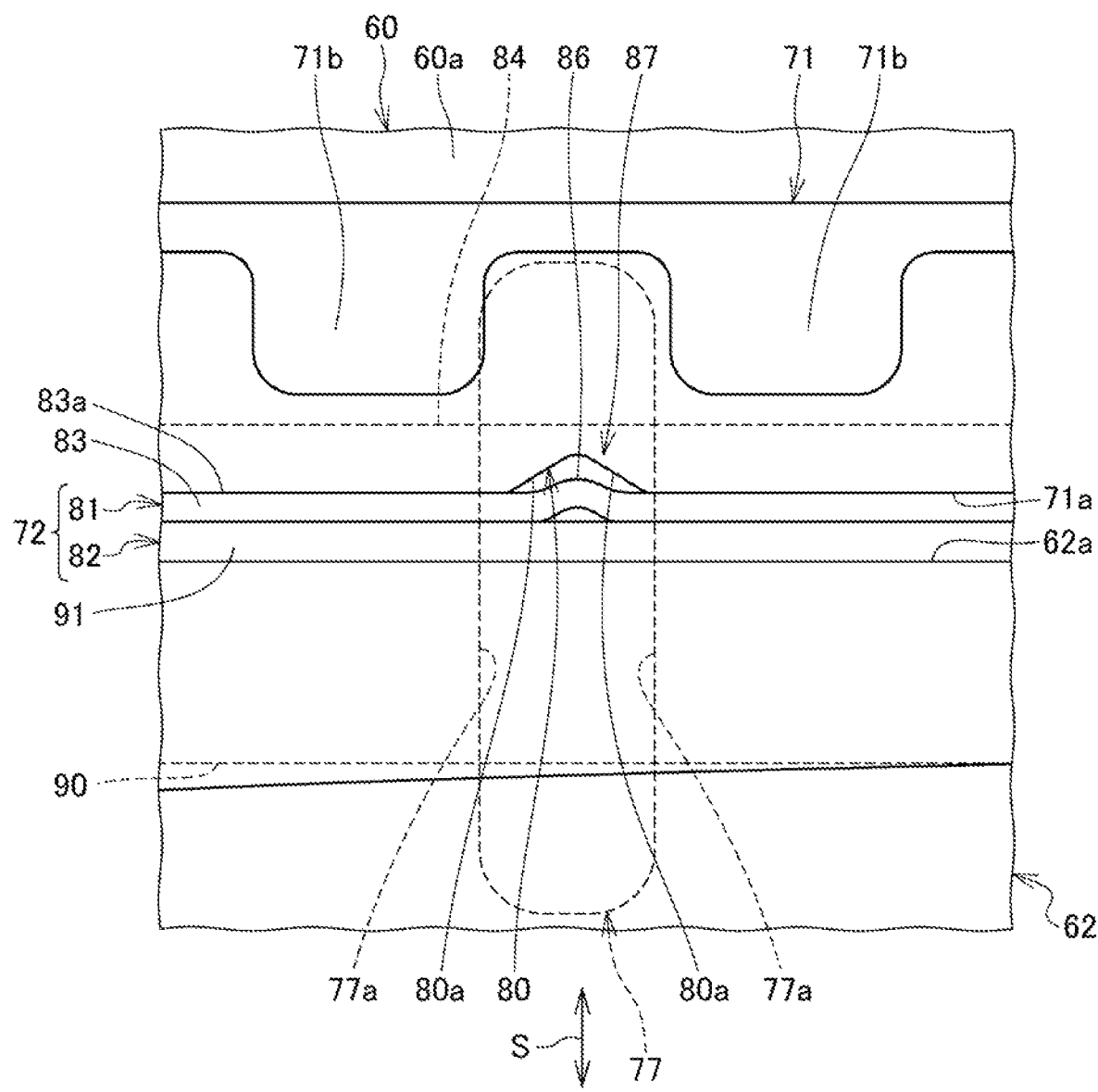
FIG. 6 is a side view when the engagement portion of the pre-load controller and an intermediate member is viewed from the outer side in the radial direction.

FIG. 6 is a side view when the engagement portion of the pre-load controller 71 and the intermediate member 72 is viewed from the outer side in the radial direction.

Referring to FIG. 2 to FIG. 4 and FIG. 6, the intermediate member 72 includes a first intermediate member 81 and the second intermediate member 82, the first intermediate member 81 abutting on the abutment surface 71*a* of the pre-load controller 71, the second intermediate member 82 being arranged separately from the first intermediate member 81 and being sandwiched between the first intermediate member 81 and an end surface 62*a* of the spring 62.

Figure 7:
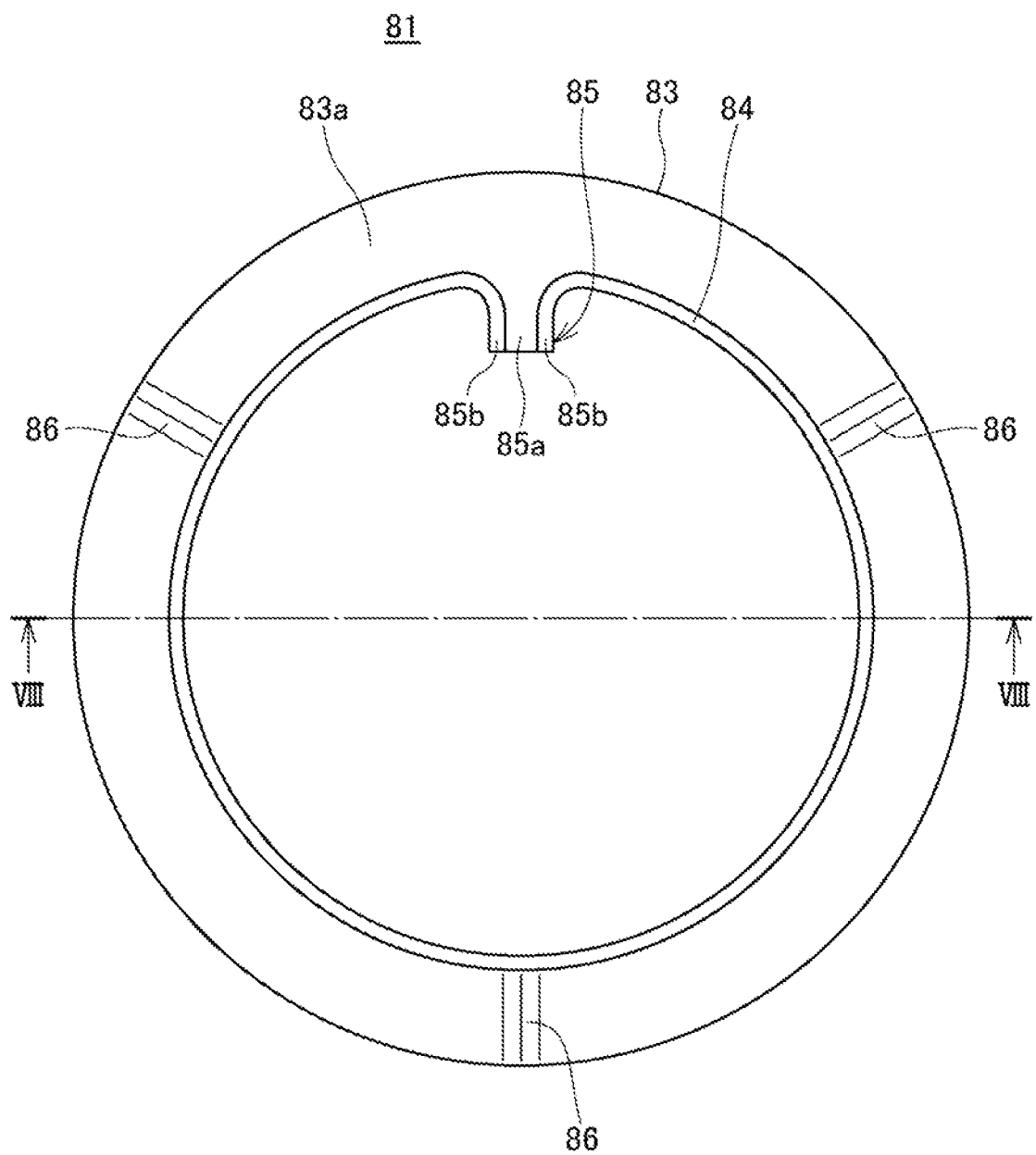
FIG. 7 is a plan view when a first intermediate member is viewed from the pre-load controller side.
Figure 8:
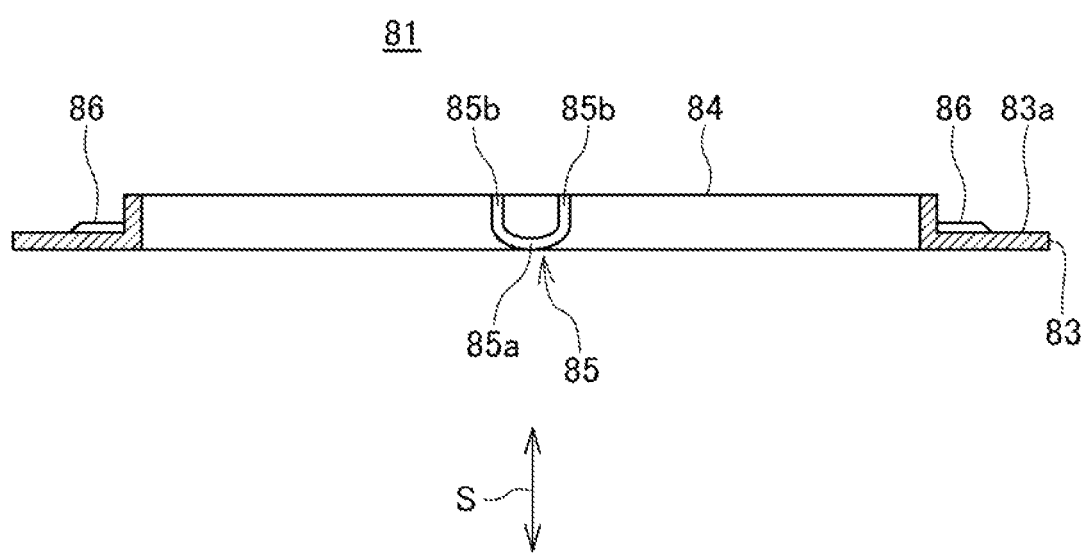
FIG. 8 is a cross-sectional view taken along the line VIII-VIII of FIG. 7.

FIG. 7 is a plan view when the first intermediate member 81 is viewed from the pre-load controller 71 side. FIG. 8 is a cross-sectional view taken along the line VIII-VIII of FIG. 7.

Referring to FIG. 2 to FIG. 8, the first intermediate member 81 includes a ring-like ring portion 83 and a cylindrical projected portion 84, the outer circumferential portion 60*a* of the one end portion 60 being inserted to the ring portion 83, the cylindrical projected portion 84 being arranged upright in the stroke direction S toward the pre-load controller 71 side from the inner circumferential edge of the ring portion 83.

Also, the first intermediate member 81 includes an engagement portion 85 that protrudes inward in the radial direction toward the center of the ring portion 83 from the inner circumferential surface of the cylindrical projected portion 84.

The ring portion 83 is a disk-like ring, and the upper surface of the ring portion 83 is an abutment surface 83*a* abutting on the abutment surface 71*a* of the pre-load controller 71 in the stroke direction S.

On the abutment surface 83*a*, plural numbers of projected portions 86 are arranged at equal intervals in the circumferential direction of the first intermediate member 81, the projected portions 86 protruding in the stroke direction S toward the pre-load controller 71.

The projected portions 86 of the first intermediate member 81 engage with the recessed portions 80 of the pre-load controller 71. The projected portions 86 are arranged by the same number of pieces with the recessed portions 80 and at the same intervals with the recessed portions 80. Therefore, all of the projected portions 86 engage with all of the recessed portions 80 simultaneously.

The recessed portions 80 and the projected portions 86 configure irregularities 87 (FIG. 6) that allow the pre-load controller 71 and the first intermediate member 81 to engage with each other.

As shown in FIG. 5 and FIG. 6, as seen in the radial direction of the pre-load controller 71, the recessed portion 80 of the pre-load controller 71 is a groove having a V-shape configured by a pair of inclined surface portions 80*a*, and the width narrows as it goes toward the bottom portion of the groove. The recessed portion 80 penetrates the pre-load controller 71 in the radial direction, and allows the annular recessed portion 79 to communicate with the outer side of the outer circumferential surface of the pre-load controller 71.

Also, the projected portion 86 of the first intermediate member 81 is a protrusion having a triangular shape as seen in the radial direction of the first intermediate member 81, and the projected portion 86 is arranged so as to become slender as it goes toward the distal end of the protrusion.

Figure 9:
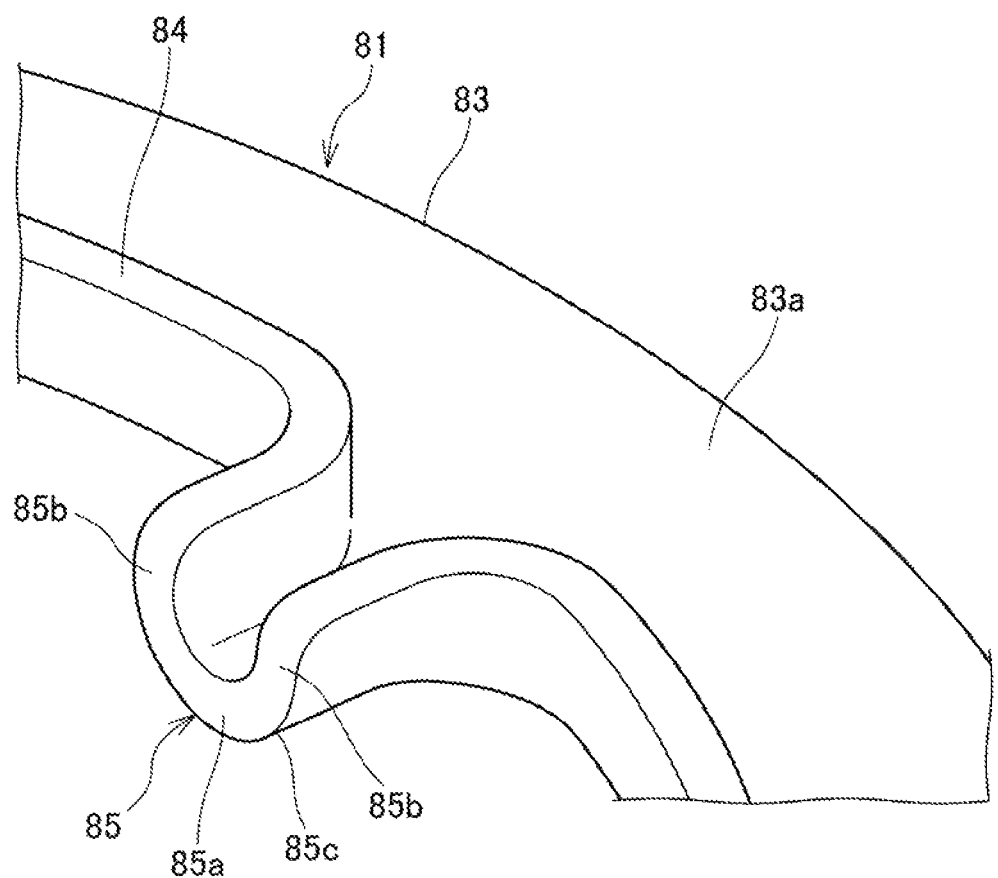
FIG. 9 is a perspective view of the circumferential portion of the engagement portion.

FIG. 9 is a perspective view of the circumferential portion of the engagement portion 85.

Referring to FIG. 7 to FIG. 9, the first intermediate member 81 is a component manufactured by that a plate member is formed by pressing. The cylindrical projected portion 84, the engagement portion 85, and the projected portion 86 are formed by bending or drawing of a plate-like base material that configures the ring portion 83.

The engagement portion 85 is formed by folding and bending the plate-like base material into a U-shape. The engagement portion 85 includes a bottom wall portion 85*a* and a pair of side wall portions 85*b*, the bottom wall portion 85*a* extending inward in the radial direction from the inner circumferential edge of the ring portion 83, the side wall portions 85*b* being arranged upright in the stroke direction S from both side edges of the circumferential direction of the bottom wall portion 85*a*, and the engagement portion 85 is formed into a U-shape. The pair of side wall portions 85*b* continues to the cylindrical projected portion 84. The height of the pair of side wall portions 85*b* is larger than the plate thickness of the ring portion 83.

The bottom wall portion 85*a* and the lower portion of the pair of side wall portions 85*b* are the bottom portion having a U-shape, and configure a curved surface portion 85*c* that curves in an arc shape.

Referring to FIG. 2 and FIG. 4, the first intermediate member 81 is attached to the one end portion 60 by that the outer circumferential portion 60*a* is inserted to the inner circumferential portion of the ring portion 83. Turning of the first intermediate member 81 around the center axis 29*a* is restricted by that the engagement portion 85 engages with the long groove portion 77 of the outer circumferential portion 60*a*.

To be more specific, turning of the first intermediate member 81 is restricted by that a part of the side wall portion 85*b* and the curved surface portion 85*c* of the engagement portion 85 abut on the inner wall portion 77*a* of the long groove portion 77.

The height of the side wall portion 85*b* of the engagement portion 85 is larger than the plate thickness of the ring portion 83, and the engagement portion 85 includes the curved surface portion 85*c*. Therefore, the contact area of the engagement portion 85 with respect to the long groove portion 77 becomes large, and the engagement portion 85 is prevented from strongly hitting the long groove portion 77.

Figure 10:
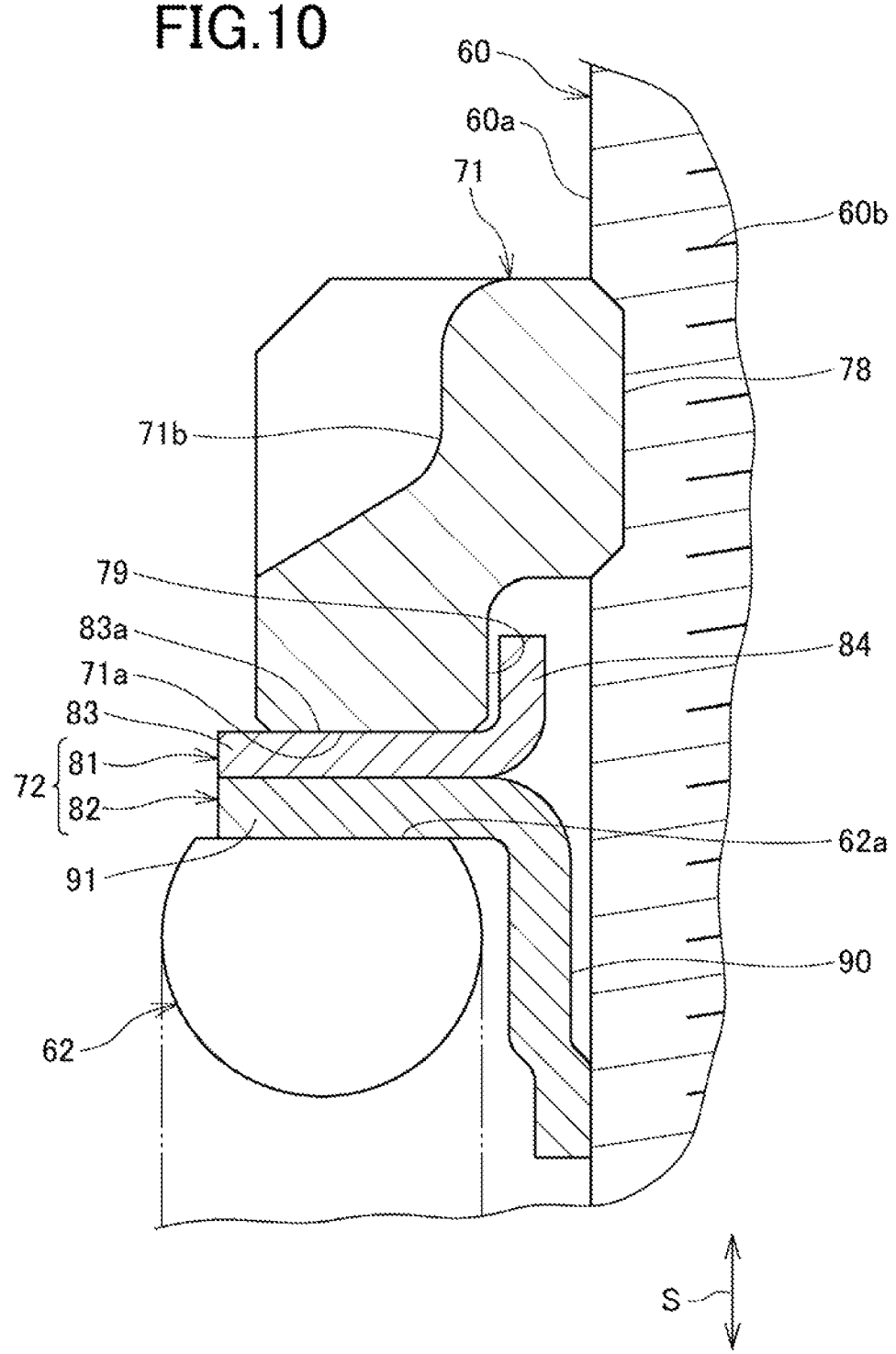
FIG. 10 is a cross-sectional view taken along the line X-X of FIG. 4.

FIG. 10 is a cross-sectional view taken along the line X-X of FIG. 4. Here, although the second intermediate member 82 is apart from the first intermediate member 81 in FIG. 4, FIG. 10 shows a state the second intermediate member 82 abuts on the first intermediate member 81 as shown in FIG. 2.

Referring to FIG. 3, FIG. 4, FIG. 6, and FIG. 10, the second intermediate member 82 includes a cylindrical portion 90 and a ring-like spring receive portion 91, the cylindrical portion 90 fitting in the outer circumferential portion 60*a* of the one end portion 60, the spring receive portion 91 extending outward in the radial direction from the upper end of the cylindrical portion 90.

With respect to the second intermediate member 82, the plate-like spring receive portion 91 is sandwiched between the ring portion 83 of the first intermediate member 81 and the end surface 62*a* of the spring 62. That is, the second intermediate member 82 directly contacts the spring 62, and receives the spring 62.

The second intermediate member 82 is movable in the stroke direction in a state the cylindrical portion 90 fits in the outer circumferential portion 60*a*. The second intermediate member 82 is not stopped from turning in the direction of turning around the center axis 29a, and is turnable.

The cylindrical portion 90 is inserted to the inner circumferential portion of the upper end portion of the spring 62, and guides the spring 62.

The second intermediate member 82 and the first intermediate member 81 are arranged separately from each other. The second intermediate member 82 and the first intermediate member 81 may be formed of different material.

For example, it is also possible to form the second intermediate member 82 by a hard material, the second intermediate member 82 directly receiving the spring 62, and to form the first intermediate member 81 by a material with excellent workability, the first intermediate member 81 having a complicated shape.

As shown in FIG. 10, the first intermediate member 81 is sandwiched between the spring receive portion 91 of the second intermediate member 82 and the abutment surface 71a of the pre-load controller 71. With respect to the first intermediate member 81, the outer circumferential portion of the cylindrical projected portion 84 fits in the inner circumferential portion of the annular recessed portion 79 of the pre-load controller 71.

Here, adjustment of the pre-load by the pre-load controller 71 will be explained.

In a state shown in FIG. 2 and FIG. 6, the pre-load controller 71 receives a reaction force of the compressed spring 62 through the first intermediate member 81 and the second intermediate member 82. In this state, the pre-load controller 71 is restricted from turning around the center axis 29a by that the projected portions 86 of the first intermediate member 81 engage with the recessed portions 80.

In the spring 62, deformation in the compression direction and torsion occur accompanying a stroke of the rear suspension 29. Therefore, the reaction force of the spring 62 includes a force pressing the intermediate member 72 and the pre-load controller 71 in the stroke direction S and a force turning the intermediate member 72 and the pre-load controller 71.

In the rear suspension 29, turning of the first intermediate member 81 is prevented by that the engagement portion 85 of the first intermediate member 81 engages with the long groove portion 77 of the outer circumferential portion 60a as shown in FIG. 4. Therefore, a reaction force of the spring 62 turning the pre-load controller 71 is blocked by the first intermediate member 81, and the reaction force is not transmitted to the pre-load controller 71. Accordingly, the pre-load controller 71 can be prevented from turning, and the pre-load can be prevented from being changed by the reaction force of the spring 62.

Also, since the second intermediate member 82 is relatively turnable with respect to the first intermediate member 81, the second intermediate member 82 turns with respect to the first intermediate member 81 by the reaction force of the spring 62. Thus, the reaction force of the spring 62 can be released by turning of the second intermediate member 82, and turning of the pre-load controller 71 can be prevented.

Further, the pre-load controller 71 is restricted from turning by engagement of the irregularities 87. Therefore, turning of the pre-load controller 71 by the reaction force of the spring 62 can be prevented.

Figure 11:
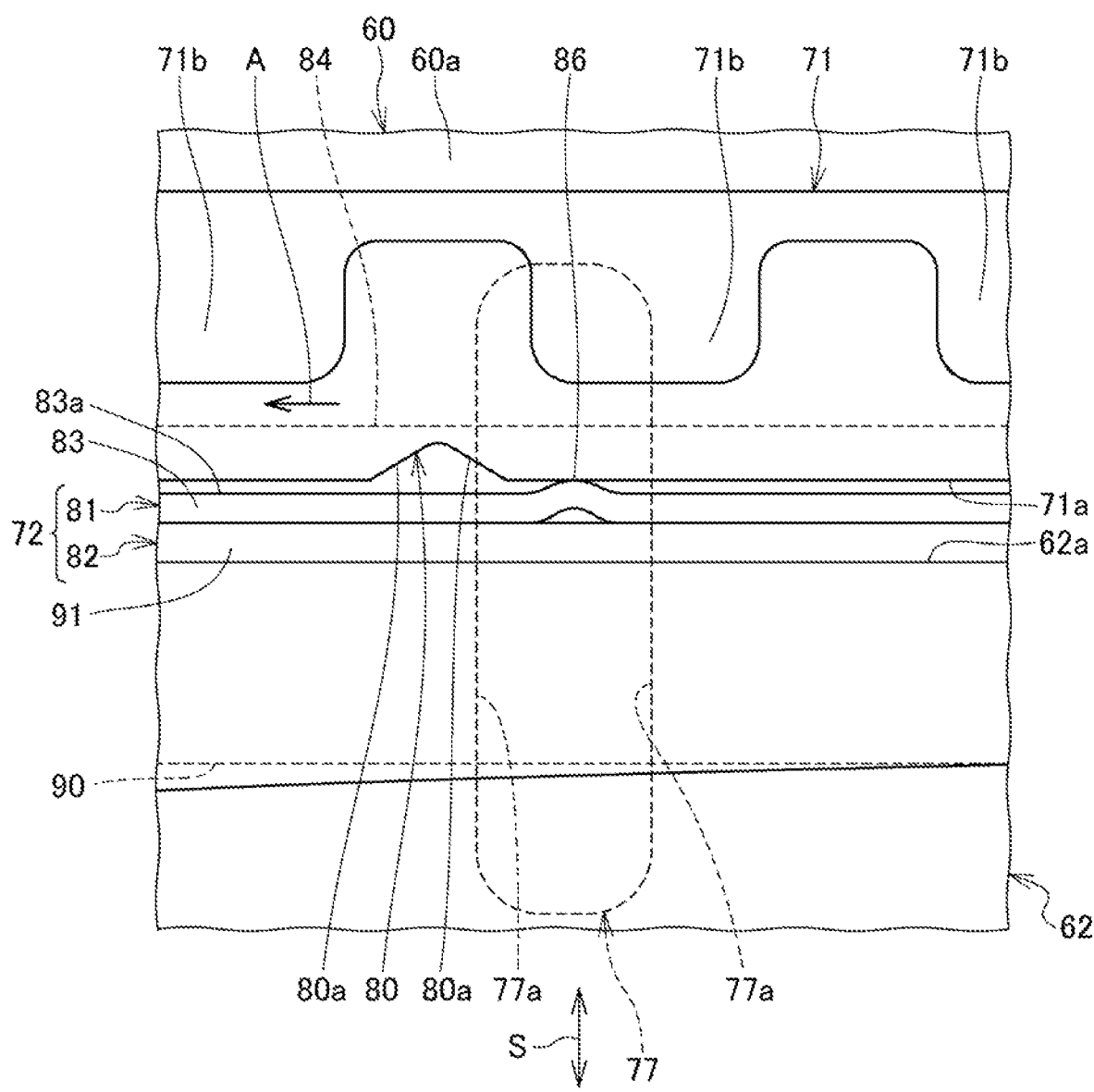
FIG. 11 is a side view showing a state the pre-load controller is controlled to turn.

FIG. 11 is a side view showing a state the pre-load controller 71 is controlled to turn.

The pre-load controller 71 is controlled to turn by the tool described above that engages with the recessed portions for tool 71b.

When the pre-load controller 71 is turned in the direction of an arrow A resisting the reaction force of the spring 62, the inclined surface portions 80a of the recessed portions 80 of the pre-load controller 71 ride over the projected portions 86, and engagement by the irregularities 87 is released. In this state, the pre-load controller 71 is turnable in a state the abutment surface 71a abuts on the apex portions of plural numbers of the projected portions 86.

When the pre-load controller 71 is turned further in the direction of the arrow A from the state of FIG. 11, the recessed portions 80 and the projected portions 86 engage with each other again, and turning of the pre-load controller 71 is restricted.

When the pre-load controller 71 is controlled to turn, the pre-load controller 71 and the intermediate member 72 move in the stroke direction S, the compression amount of the spring 62 is thereby changed, and the pre-load changes. At this time, the engagement portion 85 moves inside the long groove portion 77 in the stroke direction S.

The pre-load increases when the pre-load controller 71 moves to the other end portion 61 (FIG. 2) side, and the pre-load reduces when the pre-load controller 71 moves to the opposite side of the other end portion 61.

In the rear suspension 29, the irregularities 87 are arranged at three positions at equal intervals in the circumferential direction of the pre-load controller 71, and therefore the first intermediate member 81 can be supported excellently at the time of the turning operation. When the irregularities 87 are arranged at two positions in the circumferential direction for example, the first intermediate member 81 is likely to fall.

Also, since the irregularities 87 are arranged by plural numbers, the pre-load can be adjusted stepwise, and the pre-load is easily adjusted. With respect to the rear suspension 29, since the irregularities 87 are arranged at three positions at equal intervals in the circumferential direction, the pre-load can be adjusted in three stages per one turn of the pre-load controller 71.

Also, as shown in FIG. 10, relative turning of the first intermediate member 81 and the pre-load controller 71 is guided by that the cylindrical projected portion 84 of the first intermediate member 81 fits in the annular recessed portion 79 of the pre-load controller 71. Therefore, the first intermediate member 81 can be held by the pre-load controller 71, and the first intermediate member 81 can be prevented from falling at the time of the turning operation.

As explained above, according to an embodiment to which the present invention is applied, the rear suspension 29 includes the one end portion 60, the other end portion 61 that strokes with respect to the one end portion 60, the spring 62 that is compressed between the one end portion 60 and the other end portion 61, and the pre-load adjustment mechanism 70 that can adjust the pre-load of the spring 62, the pre-load adjustment mechanism 70 includes the pre-load controller 71 and the intermediate member 72, the pre-load controller 71 being arranged at the one end portion 60 and receiving the spring 62, the intermediate member 72 being sandwiched between the pre-load controller 71 and the spring 62, the pre-load controller 71 fits in the outer circumferential portion 60a of the one end portion 60 and is movable in the stroke direction S by turning on the thread portion 60b of the outer circumferential portion 60a, the one end portion 60 includes the long groove portion 77 in the outer circumferential portion 60a, the long groove portion 77 extending in the stroke direction S, the intermediate member 72 has a ring-shape and is movable in the stroke direction S, the outer circumferential portion 60a being inserted to the ring-shape, and the intermediate member 72 includes the engagement portion 85 that engages with the long groove portion 77 and the intermediate member 72 is restricted from turning by that the engagement portion 85 engages with the long groove portion 77.

According to this configuration, since turning of the intermediate member 72 is restricted by that the engagement portion 85 engages with the long groove portion 77 of the outer circumferential portion 60a of the one end portion 60, a reaction force of the spring 62 prompting to turn the pre-load controller 71 is blocked by the intermediate member 72. Therefore, the pre-load can be prevented from being changed by the reaction force of the spring 62. Also, since turning of the pre-load controller 71 can be prevented even when a double nut structure and the like are not used, at the time of adjusting the pre-load, the pre-load can be adjusted easily by turning the pre-load controller 71 with simple operation.

Also, the pre-load controller 71 and the intermediate member 72 engage with each other by the irregularity 87 that is configured with the recessed portion 80 and the projected portion 86, the recessed portion 80 that is one of the recessed portion 80 and the projected portion 86 is arranged in the pre-load controller 71, the projected portion 86 that is the other of the recessed portion 80 and the projected portion 86 is arranged in the intermediate member 72, and engagement by the irregularity 87 is released when the pre-load controller 71 is turned resisting a reaction force of the spring 62.

According to this configuration, by the irregularity 87 where the pre-load controller 71 and the intermediate member 72 engage with each other, turning of the pre-load controller 71 caused by the reaction force of the spring 62 can be prevented. Also, at the time of adjusting the pre-load, by turning the pre-load controller 71 resisting the reaction force of the spring 62, engagement by the irregularity 87 can be released, and the pre-load can be adjusted easily.

Also, the irregularities 87 are arranged at three positions or more at equal intervals in the circumferential direction of the pre-load controller 71.

According to this configuration, since the intermediate member 72 can be supported by the projected portions 86 that are arranged at three positions or more at equal intervals in the circumferential direction of the pre-load controller 71 in a state engagement by the irregularities 87 is released, the intermediate member 72 can be prevented from being tilted. When the pre-load controller 71 is turned, the pre-load controller 71 is positioned consecutively by the irregularities 87 located at equal intervals in the circumferential direction. Therefore, the adjustment width of the pre-load becomes stepwise, and the pre-load can be adjusted easily. Since the irregularities 87 are arranged at three positions or more, the pre-load can be adjusted finely.

Also, the pre-load controller 71 includes the annular recessed portion 79 that is arranged so as to surround the outer circumferential portion 60a, and the intermediate member 72 includes the cylindrical projected portion 84 that fits in the annular recessed portion 79.

According to this configuration, the intermediate member 72 can be supported by fitting of the annular recessed portion 79 and the cylindrical projected portion 84 in each other, and the intermediate member 72 can be prevented from being tilted at the time of adjusting the pre-load.

Also, the engagement portion 85 of the intermediate member 72 includes the curved surface portion 85c at an engagement surface engaging with the long groove portion 77.

According to this configuration, hitting of the engagement portion 85 with respect to the long groove portion 77 can be made soft, and the long groove portion 77 can be prevented from being scarred. Also, the engagement portion 85 can be formed easily by a drawing process.

Further, the intermediate member 72 may include the first intermediate member 81 and the second intermediate member 82, the first intermediate member 81 including the engagement portion 85, the second intermediate member 82 being sandwiched between the first intermediate member 81 and the spring 62.

According to this configuration, since a portion where the engagement portion 85 is arranged and a portion that receives the spring 62 are arranged separately in the first intermediate member 81 and the second intermediate member 82, the material and the working method of the intermediate member 72 can be made more suitable.

Also, the second intermediate member 82 is relatively turnable with respect to the first intermediate member 81.

According to this configuration, since the second intermediate member 82 turns with respect to the first intermediate member 81, a reaction force of the spring 62 can be released, and turning of the pre-load controller 71 can be prevented.

Also, the pre-load controller 71 is turned by the tool that is inserted to the recessed portion for tool 71b, and the pre-load can be adjusted easily. Further, by disposing the annular recessed portion 79 and the recessed portion for tool 71b separately in the stroke direction S, rigidity of the pre-load controller 71 can be secured.

Also, the rear suspension 29 connects the swing arm 13 and a body of the vehicle to each other, the swing arm 13 swingably supporting the rear wheel 3 of the motorcycle 1.

According to this configuration, in the rear suspension 29 where a load of the spring 62 is large, turning of the pre-load controller 71 can be prevented effectively, and the pre-load can be adjusted easily.

Also, the embodiment described above is to show an aspect to which the present invention is applied, and the present invention is not to be limited to the embodiment described above.

Although it is explained in the embodiment described above that the irregularity 87 is configured with the recessed portion 80 of the pre-load controller 71 and the projected portion 86 of the first intermediate member 81, the present invention is not to be limited to it. For example, the irregularity may be configured with a projected portion arranged in the pre-load controller 71 and a recessed portion arranged in the first intermediate member 81.

Further, although the embodiment described above is explained exemplifying the rear suspension 29 of the motorcycle 1, the present invention is not to be limited to it, and the present invention is applicable to a suspension of a three-wheeled vehicle including two front wheels or two rear wheels and a vehicle including four wheels or more.

REFERENCE SIGNS LIST

3 . . . Rear wheel
13 . . . Swing arm
29 . . . Rear suspension (suspension for vehicle)
60 . . . One end portion
60a . . . Outer circumferential portion
60b . . . Thread portion
61 . . . Other end portion
62 . . . Spring
70 . . . Pre-load adjustment mechanism 71 . . . Pre-load controller
71b . . . Recessed portion for tool
72 . . . Intermediate member
77 . . . Long groove portion
79 . . . Annular recessed portion
80 . . . Recessed portion
81 . . . First intermediate member
82 . . . Second intermediate member
84 . . . Cylindrical projected portion
85 . . . Engagement portion
85c . . . Curved surface portion
86 . . . Projected portion
87 . . . Irregularity

The invention claimed is:

1. A suspension for a vehicle, comprising:
one end portion;
an other end portion that strokes with respect to the one end portion;
a spring that is compressed between the one end portion and the other end portion; and
a pre-load adjustment mechanism that can adjust a pre-load of the spring,
wherein the pre-load adjustment mechanism includes a pre-load controller and an intermediate member, the pre-load controller being arranged at the one end portion and receiving the spring, the intermediate member being sandwiched between the pre-load controller and the spring,
the pre-load controller fits with an outer circumferential portion of the one end portion and is movable in a stroke direction by turning on a thread portion of the outer circumferential portion,
the one end portion includes a long groove portion in the outer circumferential portion, the long groove portion extending in the stroke direction,
the intermediate member has a ring-shape to which the outer circumferential portion is inserted and the intermediate member is movable in the stroke direction,
the intermediate member includes an engagement portion that engages with the long groove portion and the intermediate member is restricted from turning by that the engagement portion engages with the long groove portion,
the intermediate member includes a first intermediate member and a second intermediate member, the first intermediate member including the engagement portion, the second intermediate member being sandwiched between the first intermediate member and the spring, and
the second intermediate member is relatively turnable with respect to the first intermediate member.

2. The suspension for the vehicle according to claim 1, wherein the pre-load controller and the intermediate member engage with each other by an irregularity that is configured with a recessed portion and a projected portion,
one of the recessed portion and the projected portion is arranged in the pre-load controller, the other of the recessed portion and the projected portion is arranged in the intermediate member, and
engagement by the irregularity is released when the pre-load controller is turned resisting a reaction force of the spring.

3. The suspension for the vehicle according to claim 2, wherein the irregularities are arranged at three positions or more at equal intervals in a circumferential direction of the pre-load controller.

4. The suspension for the vehicle according to claim 1, wherein the pre-load controller includes an annular recessed portion that is arranged so as to surround the outer circumferential portion, and
the intermediate member includes a cylindrical projected portion that fits in the annular recessed portion.

5. The suspension for the vehicle according to claim 4, wherein the pre-load controller includes a recessed portion for a tool at an outer circumference of an end portion on the opposite side of the annular recessed portion in the stroke direction, the tool being capable of being inserted to the recessed portion for the tool.

6. The suspension for the vehicle according to claim 1, wherein the engagement portion of the intermediate member includes a curved surface portion at an engagement surface engaging with the long groove portion.

7. The suspension for the vehicle according to claim 1, wherein the suspension for the vehicle is a rear suspension that connects a swing arm and a body of the vehicle to each other, the swing arm swingably supporting a rear wheel of the vehicle.

8. A suspension for a vehicle, comprising:
one end portion;
an other end portion that strokes with respect to the one end portion;
a spring that is compressed between the one end portion and the other end portion; and
a pre-load adjustment mechanism that can adjust a pre-load of the spring,
wherein the pre-load adjustment mechanism includes a pre-load controller and an intermediate member, the pre-load controller being arranged at the one end portion and receiving the spring, the intermediate member being sandwiched between the pre-load controller and the spring,
the pre-load controller fits with an outer circumferential portion of the one end portion and is movable in a stroke direction by turning on a thread portion of the outer circumferential portion,
the one end portion includes a long groove portion in the outer circumferential portion, the long groove portion extending in the stroke direction,
the intermediate member has a ring-shape to which the outer circumferential portion is inserted and the intermediate member is movable in the stroke direction,
the intermediate member includes an engagement portion that engages with the long groove portion and the intermediate member is restricted from turning by that the engagement portion engages with the long groove portion,
the pre-load controller includes an annular recessed portion that is arranged so as to surround the outer circumferential portion, and
the intermediate member includes a first intermediate member and a second intermediate member, the first intermediate member including the engagement portion, the second intermediate member being sandwiched between the first intermediate member and the spring,
the first intermediate member includes a ring portion and a cylindrical projected portion, the ring portion having a disk shape and receiving the pre-load controller in the stroke direction, the cylindrical projected portion being arranged upright in the stroke direction from an inner circumferential edge of the ring portion and fitting the annular recessed portion, the cylindrical projected portion and the engagement portion of the first intermediate member are integrally formed such that a base material that has a plate shape and that configures the ring portion is bent, the engagement portion includes a bottom wall portion and a pair of side wall portions, the bottom wall portion extending inward in a radial direction from the inner circumferential edge of the ring portion, the side wall portions being arranged upright in the stroke direction from both side edges of the bottom wall portion and continuing to the cylindrical projected portion, and the engagement portion is formed into a U-shape, and a height of the engagement portion in the stroke direction is larger than a plate thickness of the ring portion.

* * * * *